UNITED STATES PATENT OFFICE.

JOHN T. UNDERWOOD AND FREDERICK W. UNDERWOOD, OF BROOKLYN, NEW YORK.

REPRODUCING-SURFACE FOR TYPE-WRITING AND MANIFOLDING.

SPECIFICATION forming part of Letters Patent No. 348,073, dated August 24, 1886.

Application filed March 22, 1886. Serial No. 196,200. (Specimens.)

*To all whom it may concern:*

Be it known that we, JOHN T. UNDERWOOD and FREDERICK W. UNDERWOOD, citizens of the United States, both residing at Brooklyn, in the county of Kings and State of New York, have invented an Improved Reproducing-Surface for Type-Writing and Manifolding, of which the following is a specification.

Our invention relates to an improved reproducing-surface adapted to be employed for obtaining copies of type-writing or other printed or written impressions by means of a type-writer or other printing device, or by the employment of a stylus or other writing means.

Our improved transfer-surface is spread upon a sheet or vehicle, and when so applied is adapted to be employed in place of the articles of trade commonly known and designated as "carbon paper" or "semi-carbon paper," which are employed by type-writers and others to produce copies of impressions either obtained by a machine or by a stylus or other writing means.

In carrying out our invention we employ in the manufacture of our improved transfer-surface dye-wood solutions or their active principles, which we filter and precipitate with alkalies and mineral salts, or with alkalies, acids, and mineral salts, or with acids or alkalies alone. After the solution has been filtered the precipitate is removed from the filtering device and dried. The precipitate is then mixed with lard-oil and wax or their equivalents, and the mixture is then ground together in a warm state.

The dye solutions we prefer to employ are obtained from logwood or hæmatoxylin, the active principle of logwood, Brazil wood, sapan wood, peach-wood, madder, or its active principle—alizarine.

The proportions we find to answer well in producing our improved surface are as follows: Take one pound of extract of logwood and dissolve the same in one gallon of water, then add to the solution one pound of soda and one pound of mineral salt, using one of the salts of iron or copper, preferably sulphate of copper. The mixture thus obtained is then placed in a filter. After the solution has been filtered the precipitate is removed from the device employed for filtering and then dried, after which the precipitate is ready for use. To every two pounds of precipitate thus obtained we add one pound of oil and one pound of wax, and then grind the mixture in a warm state in what is commonly known as a "paint" or other suitable grinding mill. The heated mixture thus obtained is then applied to tissue-paper or other suitable paper or fabric by means of a sponge or other suitable transferring device.

The paper or fabric to which our improved surface is to be applied is placed upon a heated table, by preference formed of iron, and heated by steam; but this may be varied.

In place of employing oil or wax, or both combined, we can employ any other suitable oleaginous matter or combination of oleaginous matter having equivalent or approximately-equivalent properties.

Having thus described our invention, what we claim, and desire to secure by Letters Patent, is—

A sheet of material or fabric coated with a composition composed of a precipitate of dye-matter, obtained as described, in combination with oil, wax, or oleaginous matter, substantially as and for the purposes set forth.

In witness whereof we have hereunto set our hands this 20th day of March, 1886.

JOHN T. UNDERWOOD.
FREDERICK W. UNDERWOOD.

Witnesses:
S. D. DITCHETT,
W. COLBORNE BROOKES.